(12) United States Patent
Koh

(10) Patent No.: US 7,899,277 B2
(45) Date of Patent: Mar. 1, 2011

(54) INTEGRATED ON-CHIP INDUCTORS AND CAPACITORS FOR IMPROVED PERFORMANCE OF AN OPTICAL MODULATOR

(75) Inventor: Ping-Chiek Koh, Goleta, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 96 days.

(21) Appl. No.: 12/474,033

(22) Filed: May 28, 2009

(65) Prior Publication Data

US 2009/0297088 A1    Dec. 3, 2009

Related U.S. Application Data

(60) Provisional application No. 61/056,743, filed on May 28, 2008.

(51) Int. Cl.
*G02F 1/35* (2006.01)
(52) U.S. Cl. .............................. 385/2; 385/1
(58) Field of Classification Search ........................ None
See application file for complete search history.

(56) References Cited

U.S. PATENT DOCUMENTS

| | | | | |
|---|---|---|---|---|
| 5,671,302 A | * | 9/1997 | Skeie | 385/2 |
| 5,675,673 A | | 10/1997 | Skeie | 385/2 |
| 5,696,855 A | * | 12/1997 | Skeie | 385/2 |
| 6,057,954 A | * | 5/2000 | Parayanthal et al. | 359/248 |
| 7,031,558 B2 | | 4/2006 | Tanbakuchi | 385/1 |
| 2010/0158540 A1 | * | 6/2010 | Takabayashi | 398/200 |

* cited by examiner

*Primary Examiner*—Sung H Pak
(74) *Attorney, Agent, or Firm*—Matthew A. Pequignot; Pequignot + Myers LLC

(57) ABSTRACT

An optical modulator for fiberoptic telecommunications is disclosed in which the optical signal velocity in the modulator waveguide and the electrical signal velocity in the traveling wave signal electrode are purposely mismatched by a factor of up to about 4. On-chip integrated inductors and capacitors are implemented to achieve the velocity mismatch. Improved electro-optic characteristics, such as return loss and sharper cut-off bandwidth are obtained.

13 Claims, 18 Drawing Sheets

INTEGRATED ON-CHIP INDUCTORS AND CAPACITORS FOR IMPROVED PERFORMANCE OF AN OPTICAL MODULATOR

CROSS-REFERENCE TO RELATED APPLICATIONS

The present invention claims priority from U.S. Provisional Patent Application No. 61/056,743 filed May 28, 2008, which is incorporated herein by reference.

TECHNICAL FIELD

The present invention is directed to modulators, and more particularly, to integrated electro-optical modulators with velocity mismatched traveling wave electrodes.

BACKGROUND OF THE INVENTION

Optical-fiber communication systems may include a transmitter with, for example, a high power, low noise laser source whose optical output is modulated with a wide bandwidth external modulator. Integrated electro-optical modulators are finding increasing use to reduce component physical size while increasing performance. To fabricate an integrated electro-optical modulator, a common substrate material for both the laser and modulator is generally required. Laser sources have been typically fabricated on compound semiconductor materials, to which the optical modulator needs to be adapted.

Electro-optical modulators are based on the principle of modifying the complex optical refractive index in an optical waveguide by the application of an electric field. For this purpose a time-varying electric modulating input signal is transmitted to electrodes located in close proximity to or in contact with an optical waveguide to create an electric field in the optical waveguide. When a constant optical power level is coupled into one end of such a waveguide, the properties of an optical signal output from the other end of the optical waveguide can be modified in response to the modulating input signal applied to the electrodes.

In the case of a dual drive Mach-Zehnder modulator, differential modulating signals are applied to the Mach-Zehnder arms to modify the phase of optical signals propagating through the respective waveguides. When the outputs of the two waveguides are coherently combined in an optical coupling region, the resulting interference produces a change in amplitude of the combined optical signal.

Electro-absorption (EA) modulators typically have a single optical waveguide, in which an electric field applied by the modulating signal modifies optical absorption to produce a change in the amplitude of the optical output signal.

Typically, the optical waveguides of a modulator are fabricated as ridges on a conducting semiconductor substrate. The ridges may comprise a p-n junction with one electrode connection made through the conducting semiconductor substrate, while the other connection is made through an electrode formed on top of the ridge so that the p-n junction can be biased to a desired level and polarity. An electric potential applied between the electrodes controls the electric field strength as well as carrier density within the p-n junction, which in turn produce changes in the refractive index and absorption constant within the optical waveguide.

In a conventional optical modulator, the factors that determine the performance of the modulator are ridge or junction capacitance, electrode capacitance, electrode inductance, length of the modulator and wire-bond pad capacitance. The equivalent circuit model of a conventional modulator is shown in FIG. 1, where $C_{pad}$ is the pad capacitance, $L_e$ is the electrode inductance, $R_a$ is the series resistance of the electrode, $C_j$ is the ridge or junction capacitance, and $R_c$ is the sum of diode forward and contact resistance. The substrate losses are represented by the loss conductance G, corresponding to a loss resistance $R_g=1/G$. All modulator parameters are functions of the length of the modulator with the exception of the bond pad capacitance. For the circuit diagram shown in FIG. 1, the modulator total capacitance, inductance, resistance and conductance are represented by several of circuit elements. This is usually termed a lumped circuit representation of the modulator. In a distributed circuit model of the modulator, the circuit shown in FIG. 1, is repeated multiple times (excluding $C_{pad}$), so that the total capacitance, inductance, resistance and conductance are distributed and represented by multiple circuit elements. In other words, the circuit in FIG. 1 (excluding the bond pad capacitance $C_{pad}$ at each end of the component chain) can be considered as a unit cell, which is repeated multiple times in order to represent an equivalent circuit of the modulator.

There are three figures of merit which depend on the modulator parameters mentioned above, which will now be briefly explained:

a) The electro-optic (EO) bandwidth;
b) The required radio-frequency (RF) drive level; and
c) The return loss, $s_{11}$.

The electro-optic (EO) bandwidth increases with lower total shunt capacitance, which is the sum of $C_j$ and $C_{pad}$. The ridge capacitance depends on the electrode length, with a longer modulator resulting in lower EO bandwidth. The required radio-frequency (RF) drive level varies inversely with the length of the modulator, with a longer length requiring a lower drive voltage. To achieve lower RF drive voltage, a longer modulator is preferred but the increased total capacitance will decrease the EO bandwidth. Thus a trade-off is needed between bandwidth and the RF drive level requirements. The return loss is very frequency dependent, as it depends on the pad capacitance, electrode inductance, series resistance and total ridge capacitance. In general, higher pad and ridge capacitance result in higher return loss while higher modulator electrode inductance and resistance reduce return loss (assuming modulator ridge has lower impedance than the electrical driving source).

For modulation rates extending to tens of gigabits/second and beyond, the propagation velocity of an optical wave in the optical waveguide is no longer negligible. As the electro-optic interaction length (approximately the length of the modulator signal electrode) becomes comparable to the electrical wavelength at the higher modulation rates, electrical distributed effects become pronounced, so matching of the optical and modulating electrical signal velocities has to be considered. An increase in velocity mismatch tends to reduce the bandwidth of the optical output signal. The electrodes used for applying an electric field to the optical waveguide are designed as electrical transmission lines or micro strip-lines along which the applied electrical modulating signal can propagate as a traveling wave. This is known as a "traveling wave" electrode structure.

In prior art the optical waveguide and the electrical transmission line is typically designed such that the group velocity of the optical wave is matched to the phase velocity of the electrical traveling wave. Velocity matching can be achieved by appropriate optical waveguide dimensioning, micro strip-line dimensioning, addition of reactive electrical components such as inductances and capacitances, or a combination of all three.

The microwave group index and optical group index are important concepts in velocity matching. The more general definitions are:

$$n = \frac{c}{v} \quad \text{[Equation 1a]}$$

where c is the velocity of light in vacuum and v is the optical group velocity or velocity of microwave signal in a medium. More specifically, $$n_{microwave} = \frac{c}{v_{microwave}} \quad \text{[Equation 1b]}$$

where $n_{microwave}$ is the microwave index and $v_{microwave}$ is the velocity of an electrical microwave signal traversing the modulator electrodes.

$$n_{optical\_group} = \frac{c}{v_{optical\_group}} \quad \text{[Equation 1c]}$$

where $n_{optical\_group}$ is the optical group index and $v_{optical\_group}$ is the group velocity of an optical wave in the waveguide.

For instance, Tanbakuchi (U.S. Pat. No. 7,031,558) discloses an electro-absorption modulator shown as a ridge 50 with a signal electrode 44 in FIG. 2(a). Bond pads 18, 22, are used to connect the EA modulator to a signal source and a termination, respectively. The signal electrode 44 is connected to bond pads 18, 22 by microstrip lines 20 and 24, respectively, which act as inductors, forming matching networks in conjunction with the bond pad capacitances and the bond wires to match the electrical impedance of the modulator ridge 50 to the signal source and a termination, respectively. With reference to FIG. 2(b), the cross-section shows microstrip lines 20 and 24, disposed on an insulating layer 54 using a ground plane provided by electrically conducting layer 55.

The optical and electrical signal velocities are matched, as can be concluded from the phase of scattering parameter $S_{21}$ of the simulated structure (Tanbakuchi's FIGS. 7C, 6B).

Tanbakuchi's FIG. 7C shows that the electrical phase of an electrical signal propagating from the input to the output of modulator shown in FIG. 6B is linear with frequency. With linear phase, the microwave index, $n_{microwave}$, can easily be estimated by choosing an arbitrary point on FIG. 7C, and applying Equation 2:

$$\beta L = \phi, \text{ where } \beta = \frac{2\pi \cdot fn}{c} \text{ giving } n = \frac{\phi \cdot c}{2\pi \cdot f \cdot L} \quad \text{[Equation 2]}$$

Substituting L=0.850 mm (from Tanbakuchi's Table 2) and choosing f=48 GHz at which $\phi=\pi$ (or 180°), the value $n_{microwave}$=3.68 can be derived for the microwave index.

The optical group index for group III-V compound semiconductors, in particular InGaAsP, generally lies in the approximate range 3.7-3.9, so the electrical and optical indexes are apparently very well matched.

A variation of the embodiment above is shown in FIG. 2(c), in which the signal electrode is segmented into sections 52 joined in series by microstrip lines 55 on the ridge 50. However, the amount of series inductance, which such microstrip lines can provide, is limited by the space on top of the ridge 50 as well as the impedance per length of the microstrip lines 55.

Skeie (U.S. Pat. No. 5,675,673) proposes a solution that places a series of inductors 531-534 on a separate circuit board 501 as can be seen in FIG. 2(d). While this provides more latitude in choosing inductance values, the separate circuit board requires additional space as well as making more electrical connections necessary to connect to the modulator. Generally this requires more bond wires, whose electrical characteristics, in particular inductance values, are difficult to control, as well as additional bond pads, each of which contribute additional shunt capacitance.

The microwave index of Tanbakuchi-like designs would tend to be in the range of 2.9-3.8, indicating that there is velocity matching between the optical and electrical waves, hence velocity mismatch would not limit the bandwidth in practice. In other words, other factors such as modulator diode capacitance, electrode metal and substrate losses contribute to the predicted bandwidth.

Furthermore, with velocity-matched and similar designs, however, additional filters are often required for increasing the roll-off characteristics of the signal channel bandwidth to avoid interference and cross-talk with neighboring channels. Such additional filters can increase losses, reduce efficiency and contribute to increased size and complexity of the device. It would be advantageous to incorporate the filter function in the integrated optical modulator.

In this disclosure, the above problems are addressed by integrating a network of inductors on the same chip as the modulator, thereby avoiding an increase in device size. Performance of the modulator is further enhanced by departure from velocity-matched conditions in a controlled manner in order to take advantage of the inherent filter characteristics under such conditions.

SUMMARY OF THE INVENTION

An optical modulator is disclosed comprising a substrate for supporting electrical components, a conducting layer on a first region of the substrate for providing an electrical ground plane, an insulating layer on a second region of the substrate for accommodating an electrical circuit, an electro-optic optical waveguide disposed on the conducting layer for receiving an input optical signal and transmitting an output optical signal. A traveling wave microstrip electrode with two or more contact segments is in contact with an upper portion of the optical waveguide for modulating the input optical signal in response to an input modulating signal applied to the microstrip electrode. Source and termination bond pads are placed on the insulating layer for receiving the input modulating signal from a signal source and transmitting a residual modulating signal to a termination circuit, respectively.

A network of reactive electrical components on the insulating layer electrically interconnects the source bond pad, the termination bond pad and the two more contact segments for modifying a microwave signal velocity in the microstrip electrode.

A method is also disclosed for limiting a spectral bandwidth of an optical signal with an optical modulator chip comprising a segmented microstrip electrode, an optical waveguide, and an electrical network of reactive components interconnecting electrode segments of the segmented microstrip electrode. The method includes providing an optical input from a lightsource, applying a microwave signal to the segmented microstrip electrode, modulating the optical input with the segmented microstrip electrode to generate an optical signal having an optical signal velocity in the optical waveguide, and modifying a microwave signal velocity in the segmented microstrip electrode with the network of reactive components to produce a mismatch with the optical signal velocity and the microwave signal velocity.

BRIEF DESCRIPTION OF THE DRAWINGS

The invention will be described in greater detail with reference to the accompanying drawings which represent preferred embodiments thereof, wherein.

DETAILED DESCRIPTION

In optical modulator design, high electro-optic (EO) bandwidth, good return loss ($S_{11}$) across the operating frequency range and low radio frequency (RF) drive voltage are figures of merit when comparing optical modulator performance. Simultaneous optimization of the EO bandwidth, $S_{11}$ and RF drive usually involves trade-off between these 3 figures of merit.

At the same time, designs with smaller physical size and fewer parts are preferred, which motivates toward integrating as many components as possible onto a common substrate.

Optical modulators according to the invention described here improve the three figures of merit while maintaining a compact physical size through two main features:

a) integrated on-chip inductors (or capacitors), placed at strategic locations along the length of the optical modulator, to improve the EO bandwidth, return loss $s_{11}$ and required voltage drive level; and b) the use of on-chip inductors (or capacitors) to create a mismatch between the velocity of the optical and electrical signals propagating along the waveguide and traveling wave electrode, respectively. The velocity mismatch results in a bandwidth filtering of the EO frequency response. The filtering has two components of interest: a 50 dB/decade filter roll-off component, representing a 30 dB improvement when compared to the 20 dB/decade typically achieved in a typical modulator resistance-capacitance (RC) roll-off, and a bandwidth limiting component.

The electrode design methodology disclosed herein is universal and can be applied to all modulator designs such as semiconductor based Mach-Zehnder (MZ) modulators and electro-absorption (EA) modulators, as well as lithium niobate ($LiNBO_3$) modulators.

Figure 3A:
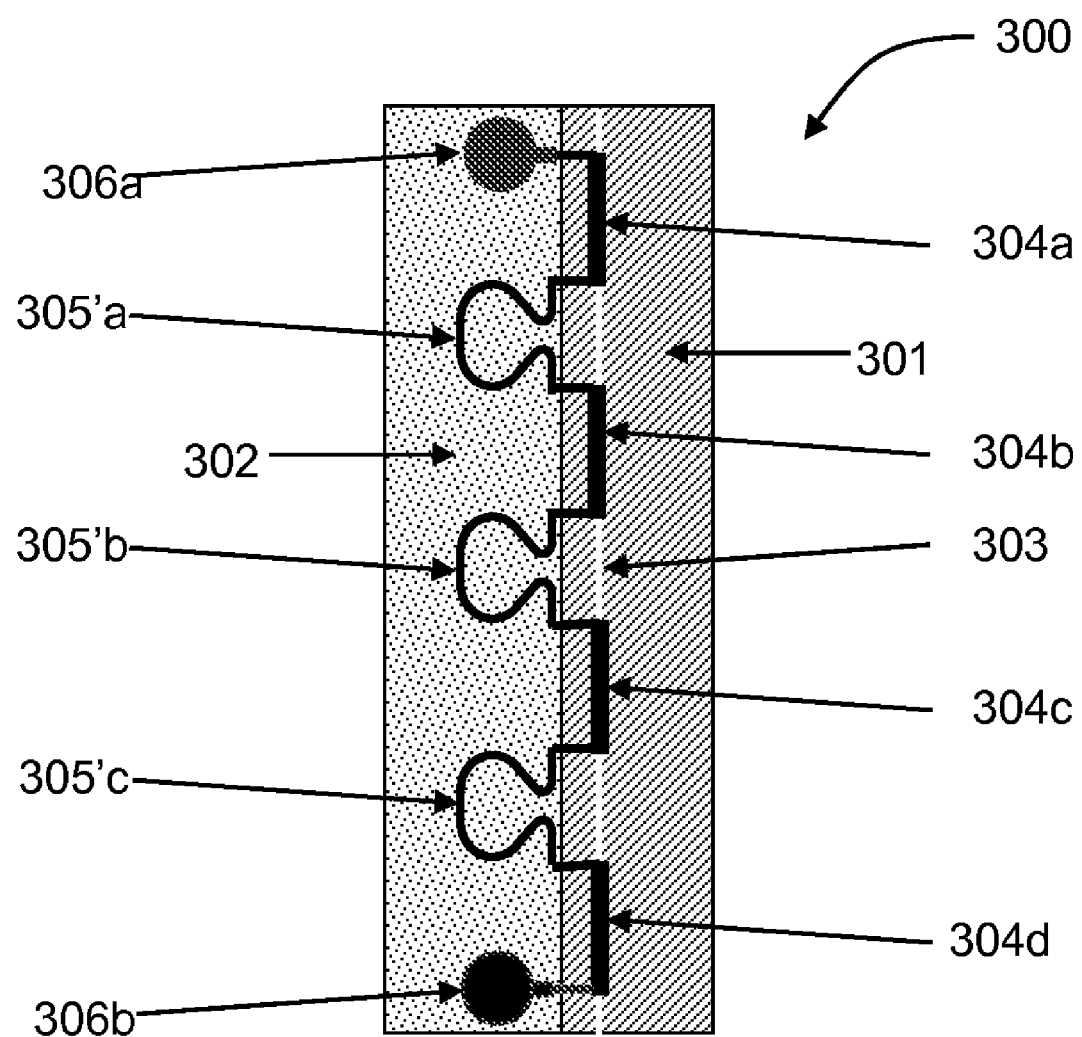
FIGS. 3(a) and 3(b) are plan views of modulators with on-chip inductors placed in two different configurations to improve modulator performance according to this invention.

A first embodiment comprising on-chip inductors to improve modulator performance is shown in plan view in FIG. 3(a). A conducting layer 301, typically n-doped, on modulator chip 300 extends to one side from under a ridge waveguide 303 for providing a connection from an n-side of a p-n junction (310 in FIG. 3(c)) within the ridge waveguide 303 to a metal ground electrode (not shown). An insulating layer 302 extends over the rest of the modulator chip 300 up to the other side of the ridge waveguide 303. The insulating layer 302 may consist of layers of semi-insulating semiconductor materials, or layers of dielectric material, or a combinations of both. The conducting layer 301 may also extend partly or completely underneath insulating layer 302.

Figure 3B:
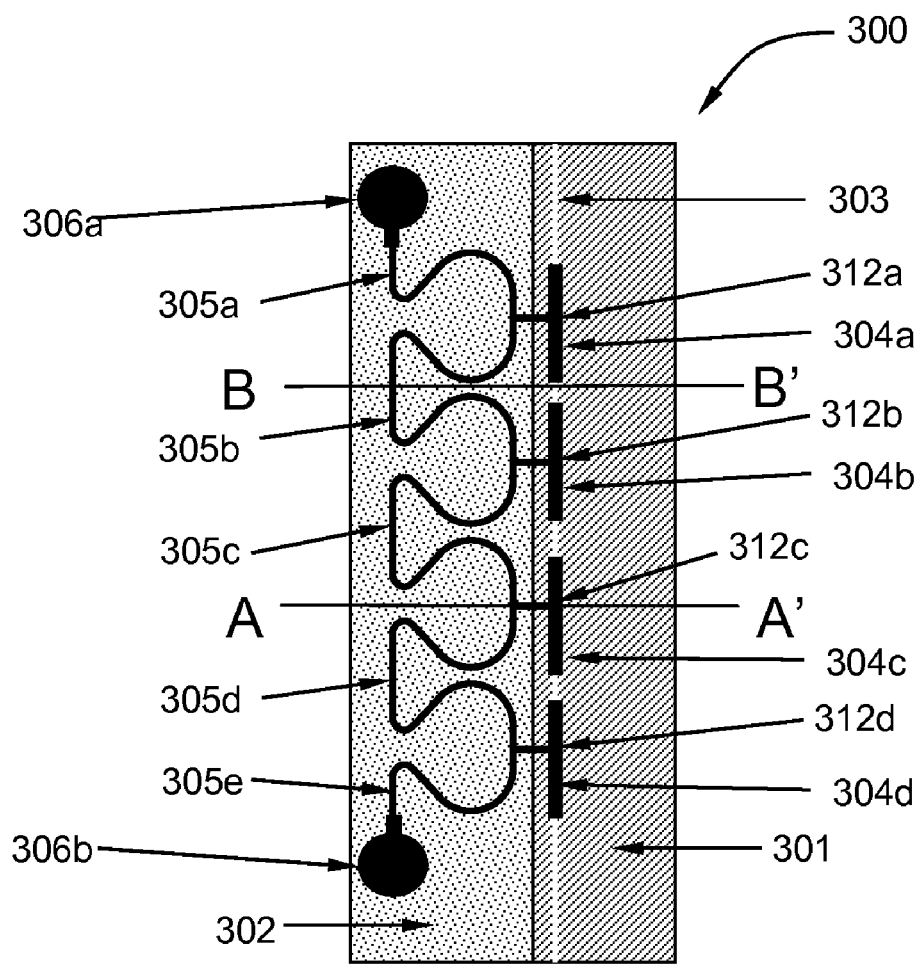
Figure 3C:
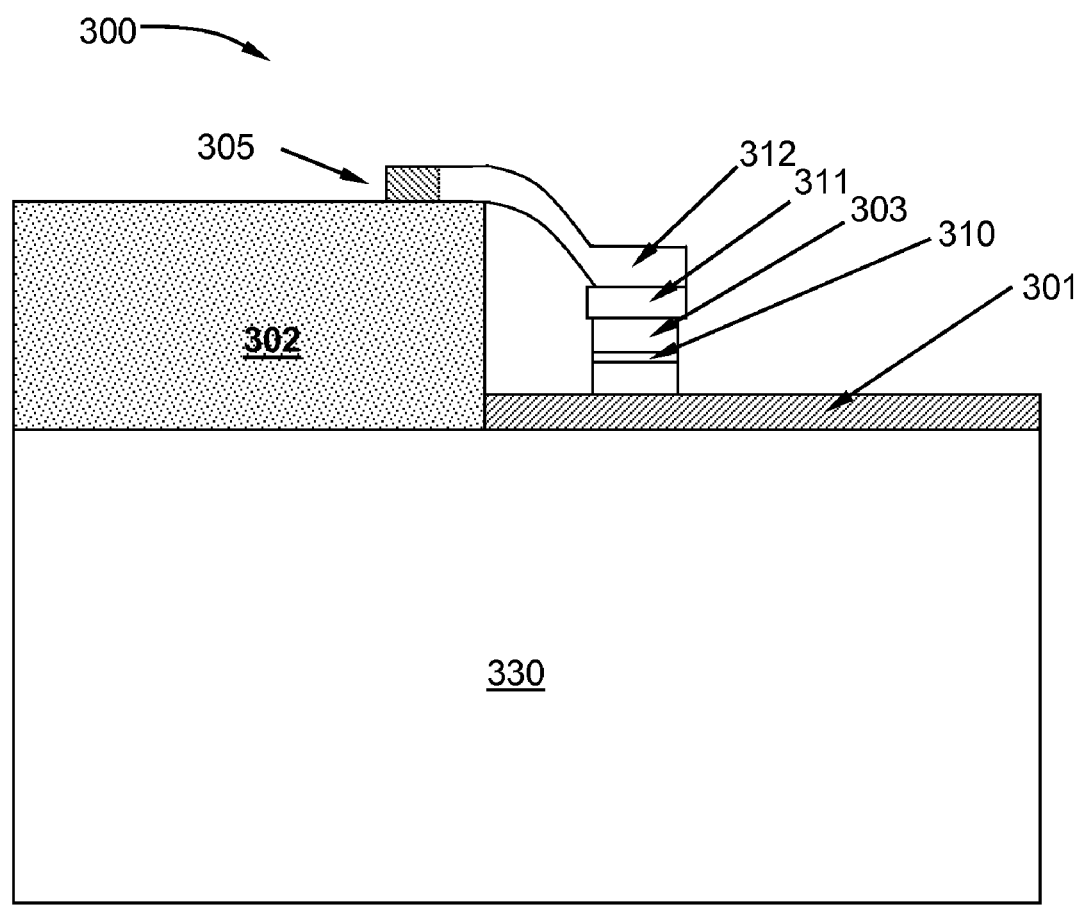
FIGS. 3(c) and 3(d) are cross-sectional views of the modulator in FIG. 3(b) along sections A-A' and B-B', respectively.

Conducting electrode segments 304a-d are disposed on top of the ridge waveguide 303 for providing a signal electrode connection to the p-n junction (310 in FIG. 3(c)) within the ridge waveguide 303. The length and number of the signal electrode segments 304a-d are chosen to achieve a prescribed electric field distribution longitudinally along the ridge waveguide 303. Four segments are shown in this embodiment by way of example, but the number can vary from 2 to more than 6. A typical total modulator length lies in the range 700 µm-900 µm. The number of signal electrode segments 304a-d depends primarily on the total length of the modulator chip 300. Typically a segment length should be between 200 µm and 350 µm.

Two bond pads 306a, 306b, preferably deposited on the insulating layer 302 are connected to electrode end segments 304a, 304d to provide external connection to a microwave signal source and a resistive termination, respectively (both not shown). The four electrode segments 304a-d are connected in series through inductors 305'a-c, which are also located on the insulating layer 302. The inductance values of the inductors are chosen according to the required impedance matching with the microwave signal source and the resistive termination, as well as to adjust the microwave signal velocity propagating along the electrode segments 304a-d with respect to the optical signal velocity in the ridge waveguide 303. For structures in which only a single electrode segment is desired, each end of such a single electrode segment would be connected through an inductor to the bond pads 306a, 306b, respectively.

FIG. 3(b) is a plan view of a second embodiment of modulator chip 300 with a different configuration of inductors 305a-e and their interconnection with signal electrode segments 304a-d. The conducting layer 301, insulating layer 302, ridge waveguide 303 and bond pads 306a,b are the same as in the first embodiment. Again, the length and number of the signal electrode segments 304a-d can be suitably chosen for a particular application. Only four segments are shown in this example. The inductors 305a and 305e connect to bond pads 306a,b while the inductors 305b-d are connected between the segments 304a-d via taps 312a-d, respectively, which are preferably located at the center of each segment 304a-d.

Each of the inductors 305a-e forming a network, shown in this example as a series connection between the bond pads 306a,b, comprises meandering metal traces, but can assume other path shapes such as spirals, squares or polygons in general comprising corners or curves having various radii of curvature. The various curves and shapes can be employed for increasing the inductance of the inductors 305a-e within a given confined space on the modulator chip 300. The inductance value of the inductors 305a-e, as well as the position of the taps 312a-d is chosen, as before, according to impedance matching and microwave velocity adjustment requirements. The segments and inductors may be of different values.

Each signal electrode segment 304a-d still interacts with the additional series inductors 305a-e similar to those in the FIG. 3(a), but in this case, there is an advantage of reducing the space required, as the space between the electrode segments 304a-d can now be made much smaller. For the same interaction length of the electrode, the modulator length can thus be reduced, resulting in less optical insertion loss.

FIG. 3(c) is a cross-section of the second embodiment along section A-A' in FIG. 3(b). As in FIG. 3(b), the modulator chip 300 comprises the substrate 330 with the conducting layer 301, preferably of semiconductor material, extending over a part or whole of the surface area of the substrate 330. A modulator diode 310 comprising a p-n junction within an optical ridge waveguide 303 is electrically connected to the conducting layer 301 and a traveling wave electrode 311 on top of the optical ridge waveguide 303. The modulator diode 310 layer structure may contain an intrinsic layer, single or multiple quantum wells as well as a p-type and n-type semiconductor region designed according to the required electro-optic characteristics for the modulator function.

The traveling wave electrode 311 is connected by means of the taps 312a-d or other suitable bridge contact structure to the inductors 305a-e situated on the insulating layer 302.

The substrate 330 is preferably insulating or semi-insulating in order for the inductors 305a-e to have minimal capacitance to the conducting layer 301, which is typically at ground potential. In effect, the achievable inductance value per substrate area can thus be maximized. On the other hand, if the substrate 330 is of conducting type, it can function together with the conducting layer 301 as a ground reference of the modulator. In that case the thickness of the insulating layer 302 would be increased accordingly to provide the necessary separation between the inductors 305 a-e and substrate 330, which would function as a ground plane.

Figure 3D:
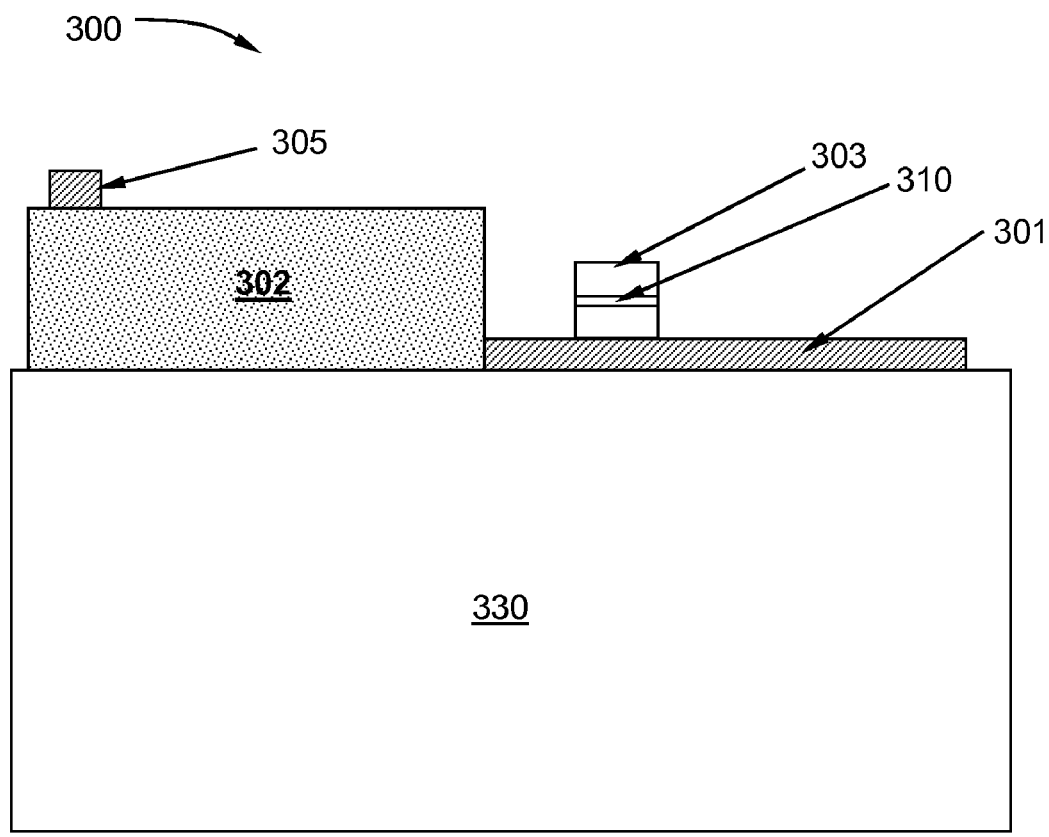

FIG. 3(d) is a cross-section of the second embodiment along section B-B' in FIG. 3(b), which is at a point on the optical ridge waveguide 303 where there is a break between the signal electrode segments 304a-d shown in FIG. 3(b). All elements have the same reference number as in FIG. 3(c). In this view the inductors 305a-e are seen to extend laterally away from the conducting layer 301, thereby reducing their capacitance.

Figure 1:
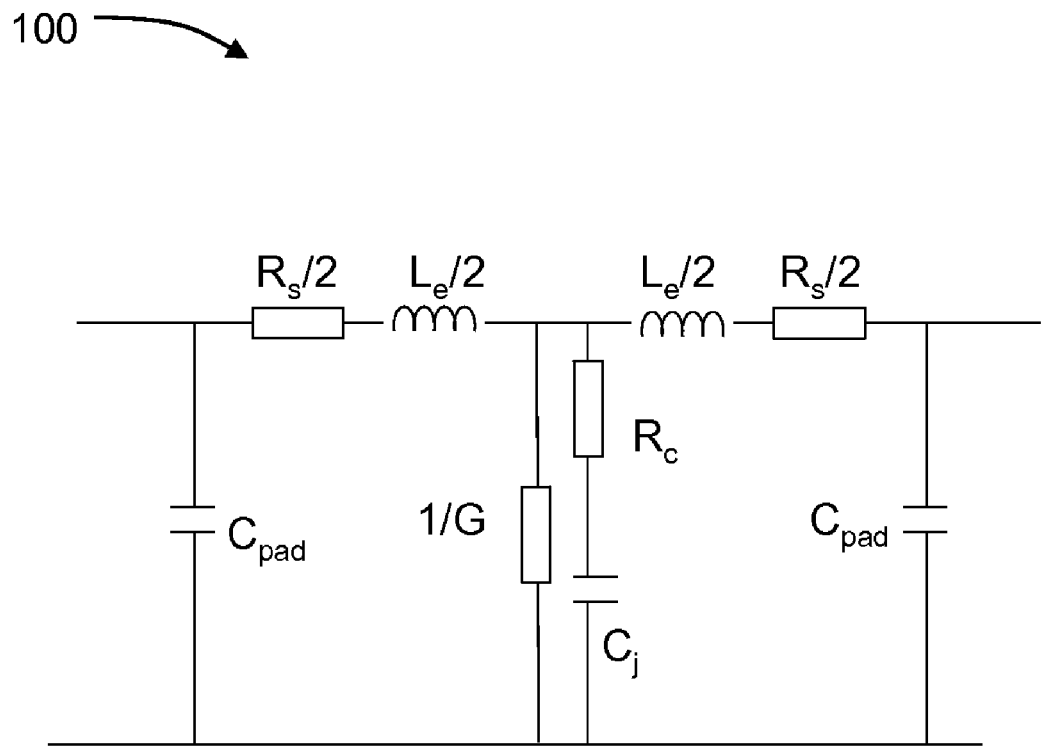
FIG. 1 is an equivalent circuit of a typical prior art modulator using a lumped element circuit representation, which is also a unit cell of a distributed circuit representation, where it is repeated multiple times (excluding the two $C_{pad}$ at each end)
Figure 2A:
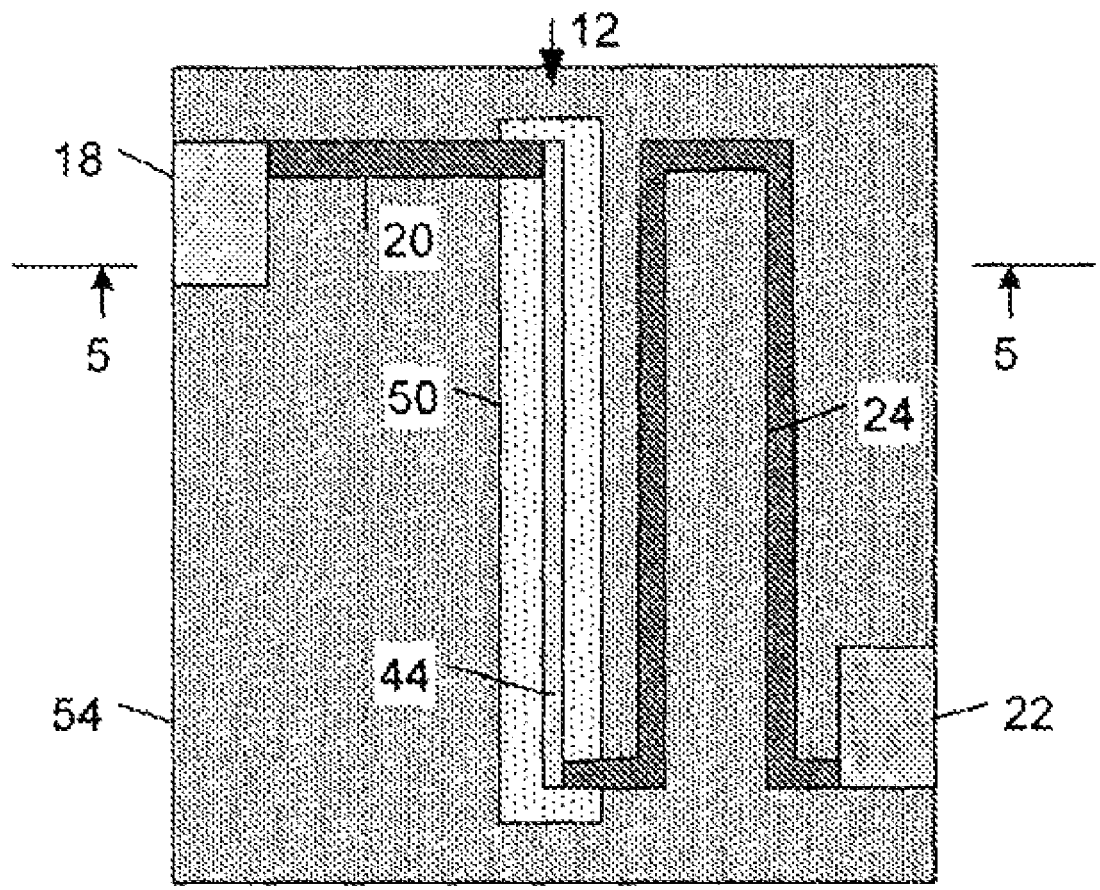
FIG. 2(a) is a plan view of a prior art modulator design.
Figure 2B:
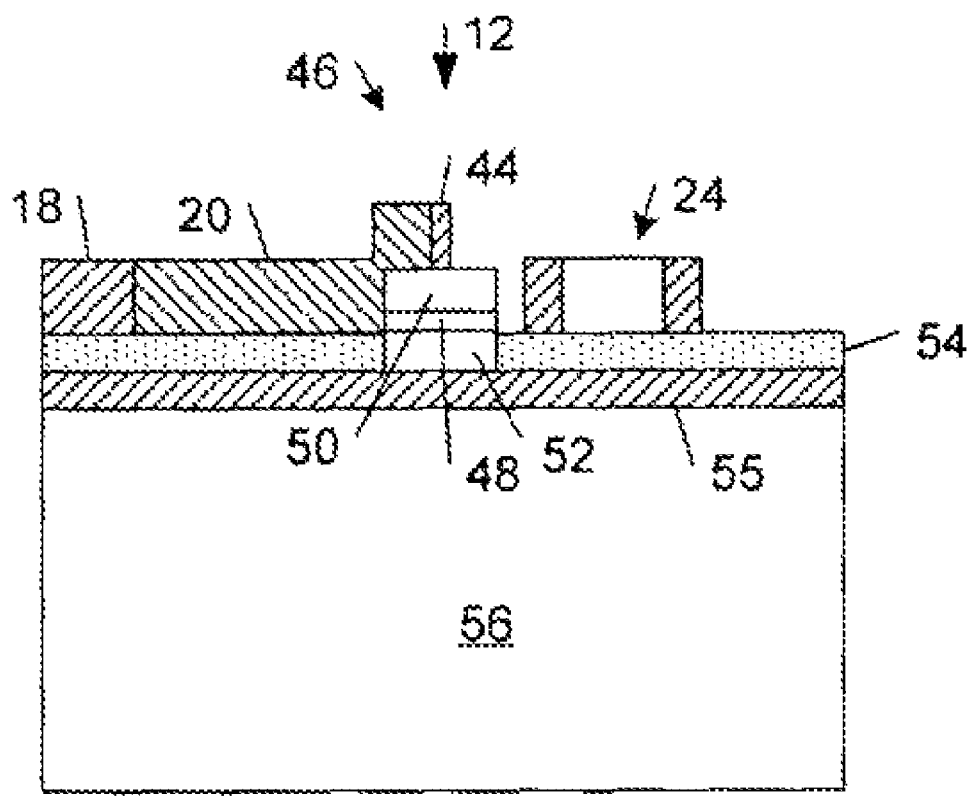
FIG. 2(b) is a cross-section of the prior art modulator in FIG. 2(a)
Figure 2C:
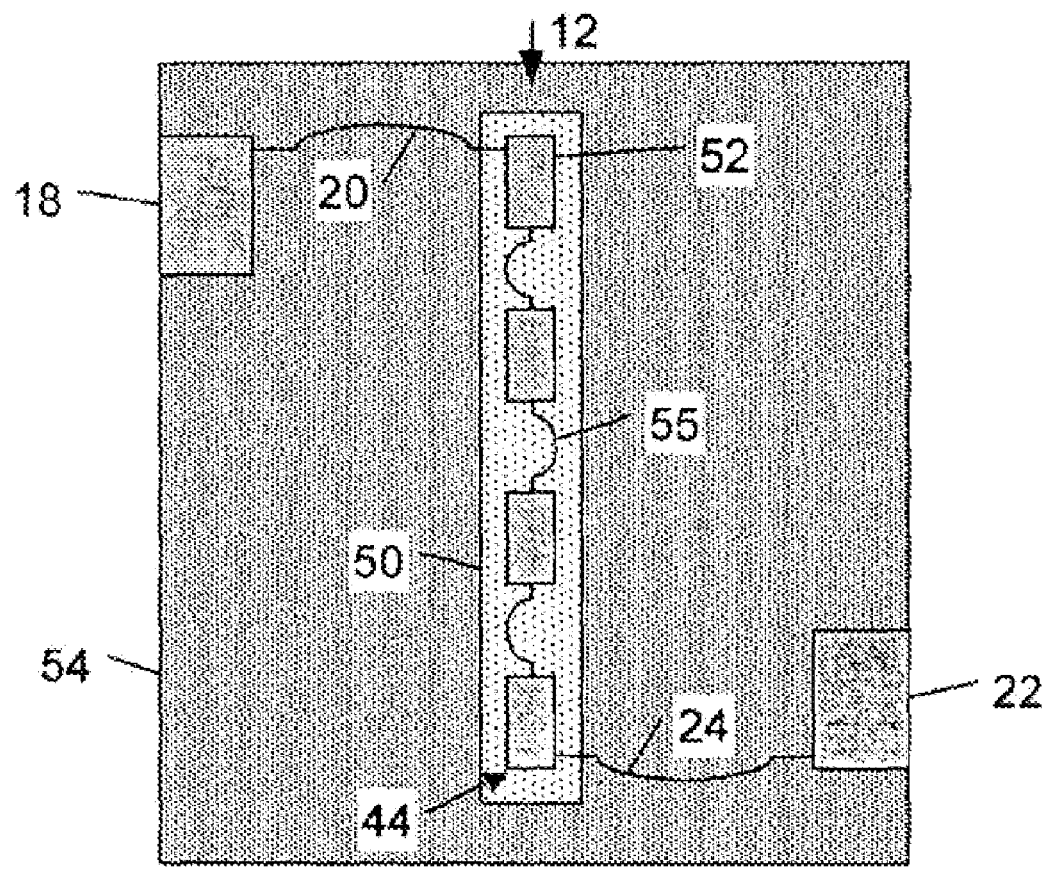
FIG. 2(c) is a plan view of a prior art modulator design with segmented electrodes.
Figure 2D:
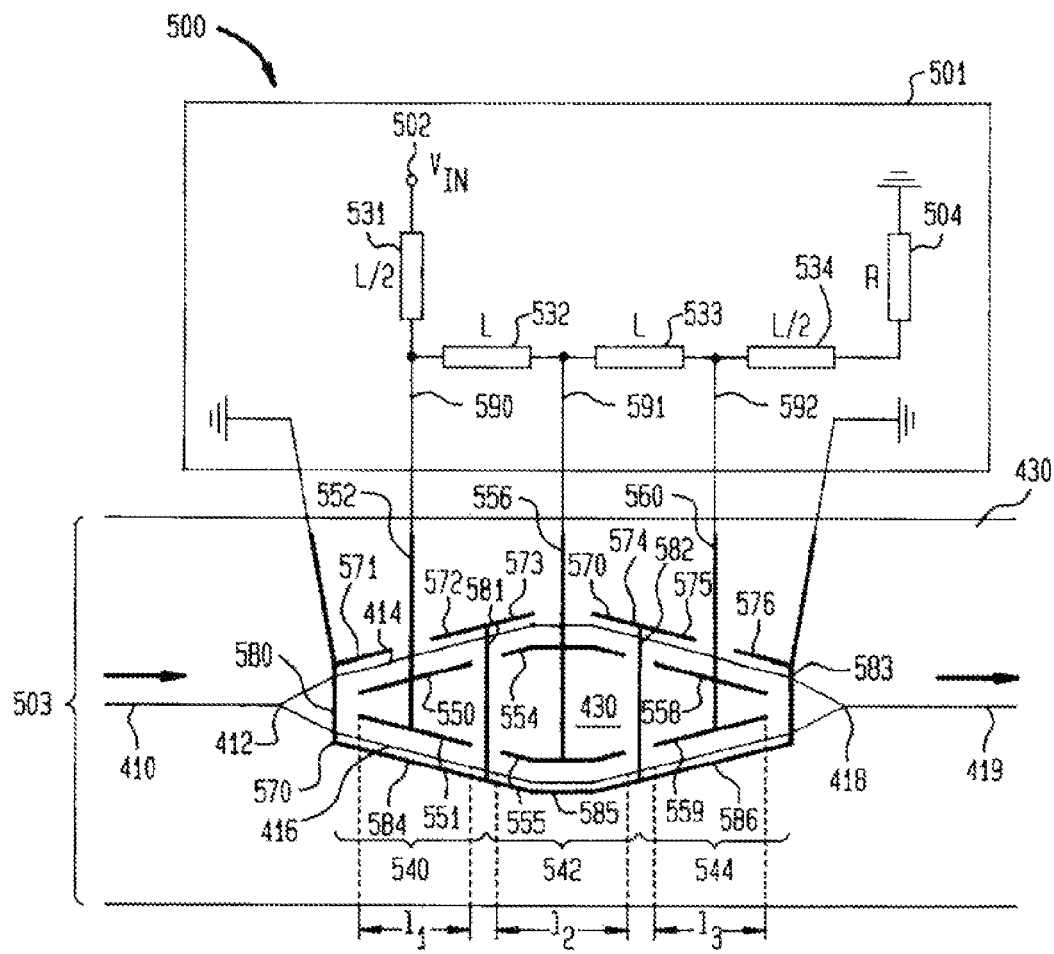
FIG. 2(d) is a plan view schematic of a prior art modulator design with segmented electrodes and inductors placed on a separate circuit board.

To illustrate the basic working principle of the disclosed modulator structure, consider an InP base optical modulator, as shown in FIG. 3(a), without the bond pads 306a,b. For simplicity, the on-chip inductors 305'a-c are connected in series with the optical modulator signal electrode segments 304a-d at regular intervals. In other words, for a given length of modulator, an additional inductance $L_u$ nH is added such the total inductance is $(L_u+L_e)$. The four sections of the modulator signal electrode segments 304a-d can be represented by the equivalent circuit diagram shown in FIG. 1, but excluding the pad capacitance $C_{pad}$.

The influence on the performance of the modulator, as a result of the addition of the on-chip inductors 305'a-c, can be understood by considering the circuit model of one section of a modulator with on-chip inductors connected to its ends. At high frequency, the impedance of the modulator alone can be approximated as $$Z_{in} \approx \sqrt{\frac{L_e}{C_j}} \qquad \text{Equation [3]}$$

where $L_e$ is the ridge metal electrode inductance and $C_j$ is the ridge capacitance. In a modulator ridge structure without additional series inductors, a typical value of input impedance $Z_{in}$ is in the range of 25-30Ω. Using a 50Ω reference system, the return loss is about −10 dB. Including the additional on-chip inductance increases the input impedance of the modulator to $$Z_{in} \approx \sqrt{\frac{L_e + L_u}{C_j + C_u}} \qquad \text{Equation [4]}$$

where $C_u$ is the total parasitic capacitance and $L_u$ is the added inductance of the on-chip integrated inductor connected to the modulator. Using the modulator structure as described in FIG. 3(a) or FIG. 3(b), the modulator input impedance $Z_{in}$ can be increased to between 34Ω and 40Ω. This improves the return loss $S_{11}$ to less than about −17 dB.

The EO bandwidth is inversely proportional to the propagation loss, α, of an electrical signal propagating along the modulator traveling wave electrode:

$$\alpha \approx 0.5 \sqrt{\frac{R_s}{Z_{in}}} \qquad \text{Equation [5]}$$

Thus, it can be seen that with the increase in modulator input impedance $Z_{in}$, the propagation loss α of the electrical signal along the modulator is decreased. With the decrease in the propagation loss, the EO bandwidth of the modulator, which is proportional to the average signal along the electrode length, is increased for a given length of the modulator. In addition to that, with improved return loss $S_{11}$, more voltage is transferred from the signal source to the modulator. These two factors have the effect of increasing the EO bandwidth.

The increase in EO bandwidth can then be traded to decrease the modulator RF drive voltage by increasing the length of the modulator. The RF drive voltage required is decreased by the increase in the electro-optic interaction length of the modulator.

InP based electro-absorption modulators fabricated according to FIG. 3(b) with different amounts of on-chip inductors 305a-e will be used to illustrate another embodiment of this invention. Although InGaAsP on InP devices are described here, the same design principles may be applied to modulators fabricated in other semiconductor material systems such as those based on GaAs. The modulators described below are suitable for 10 Gbit/s Return-to-Zero (RZ), Non-Return-to-Zero (NRZ), or 40 Gbit/s Optical Duo-Binary (ODB) transmitter applications. These applications require electro-optical bandwidth around 10-12 GHz. RF drive voltage limits and phase versus voltage efficiency for the material used in this embodiment require an electro-optic interaction length of about 800 μm. Phase voltage efficiency (for a particular reference modulator length and optical wavelength) is understood here as the phase change (radians or degrees) of the optical signal for a given applied modulator voltage. The modulator signal electrode is divided into four segments 304a-304d, all 200 μm in length for this example, giving a total modulator length of 800 μm (neglecting separations between the signal electrode segments).

The range of values for ridge capacitance, $C_j$, for each of the modulator signal electrode segments 304a-d can be computed from the ridge capacitance per unit length of the modulator. Measured ridge capacitance per unit length for a preferred design is 0.8 pF/mm to 0.95 pF/mm, although this can vary from about 0.5 pF/mm to 1.4 pF/mm in practice. The corresponding ridge metal electrode inductance lies in the range of 0.55 nH/mm to 0.65 nH/mm, however values from about 0.3 nH/mm to 0.8 nH/mm are possible, with a preferred range around 0.65 nH/mm for the present example. Thus, the ridge capacitance and ridge metal electrode inductance per signal electrode segment lies in the range of 0.16-0.19 pF and 0.11-0.13 nH respectively. Each of the modulator signal electrode segments 304a-304d is connected to on-chip inductors 305b-305d of equal amounts of inductance, however some variation in the inductance values among the on-chip inductors 305b-305d may be possible depending on a specific design.

The on-chip inductors 305b-305d are fabricated such that the added inductance between any two of the modulator signal electrode segments 304a-d lies in the range of 0.22 nH and 0.34 nH for the design space pertaining to the application and fabrication process of the present embodiment. For example, in the 800 μm long modulator designs #1 and #3 the values of inductance of the on-chip inductors 305b-305d are 0.34 nH and 0.24 nH, respectively. In other design approaches, the inductance value for the on-chip inductors 305b-305d may lie in the range from 0.15 nH to 0.4 nH. Inductors 305a,e used in this embodiment to connect to bond pads 306a and 306b, respectively, have values typically in the range of 0.055 nH-0.34 nH.

Depending on the process, material, and epitaxial structure of the modulator shown in FIG. 3(c), the ridge capacitance can deviate from the range quoted above. A rule-of-thumb guideline on the amount of inductance to be added can still be developed based on designs #1 and #3, provided the parasitic capacitance of the on-chip inductors 305b-305d is low compared to the ridge capacitance. Here, all capacitance and inductance values are referenced to a unit length along the ridge waveguide 303. For example, with ridge capacitance values of 0.8 pF/mm to 0.95 pF/mm an on-chip inductance value range of 1.2 nH/mm to 1.9 nH/mm applies.

When the modulator is fabricated such that the ridge capacitance falls outside the range quoted earlier, the range of on-chip inductance can be scaled proportionately with respect to the ridge capacitance to arrive at a new range in which the methodology disclosed herein will still work. For example, for a fabrication process that results in a ridge capacitance of 0.7 pF/mm, applying a scaling reference of 0.875 pF/mm (the mean value of the above range for ridge capacitance values, 0.8 pF/mm to 0.95 pF/mm) results in a new range of 0.96 nH/mm to 1.82 nH/mm for the applicable on-chip inductance. With this lower ridge capacitance of 0.7 pF/mm, the modulator bandwidth will be higher than designs #1 and #3.

Any excess bandwidth so obtained can be traded for a lower signal voltage required to drive the modulator. For this trade-off the total electro-optic interaction length is scaled inversely with the fabricated ridge capacitance using the reference length of 800 um. For example, assuming the same 0.7 pF/mm for the ridge capacitance as before, the resulting total length of the modulator is 0.875/0.70*800 μm=1000 μm long, which requires approximately 20% less drive voltage.

For cases where the parasitic capacitance of the on-chip inductors is high due to limitations of a particular fabrication process, the total capacitance may be more appropriate for the scaling instead of ridge capacitance. Total capacitance values, which include the parasitic capacitance of the on-chip inductors, typically lie in the range 1.0 pF/mm to 1.2 pF/mm with the process used for the examples quoted herein.

Standard electro-absorption modulators having a length of 600 μm were also fabricated on the same InP wafer to permit a direct comparison with the 800 μm long embodiments which incorporate the on-chip inductors. All the modulators have identical wirebond pads for ease of performance comparison. The bond pads 306a,b can typically have a capacitance in the range of 65 fF to 80 fF.

Two-port scattering parameter (S-parameter) tests were conducted for these modulators using a vector network analyzer (VNA). The S-parameter measurement results are presented in FIGS. 4 and 5. In all the S-parameter tests, a 50Ω reference impedance was used.

Figure 4:
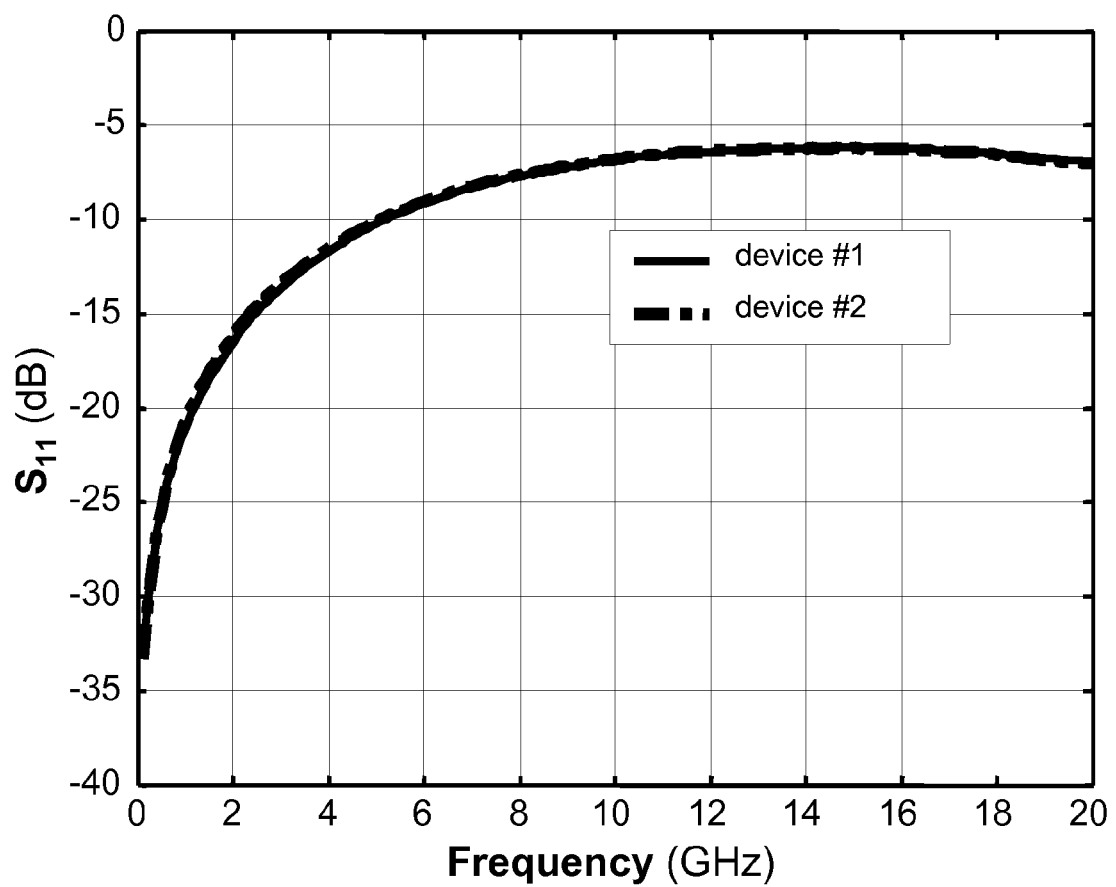
FIG. 4 is a graph of return loss $S_{11}$ measurements for 600 µm long modulators with no added on-chip inductance. The vertical axis is $S_{11}$ [dB] and the horizontal axis is frequency [GHz]. The two traces represent different modulators of identical design.

FIG. 4 shows a graph of the return loss ($S_{11}$) measurements for 600 μm long modulators with no added inductors. The vertical axis is $S_{11}$ in dB and the horizontal has units of GHz. Traces of different patterns represent different modulator devices with identical design. The $S_{11}$ rises above −10 dB for frequencies higher than 5 GHz.

Figure 5:
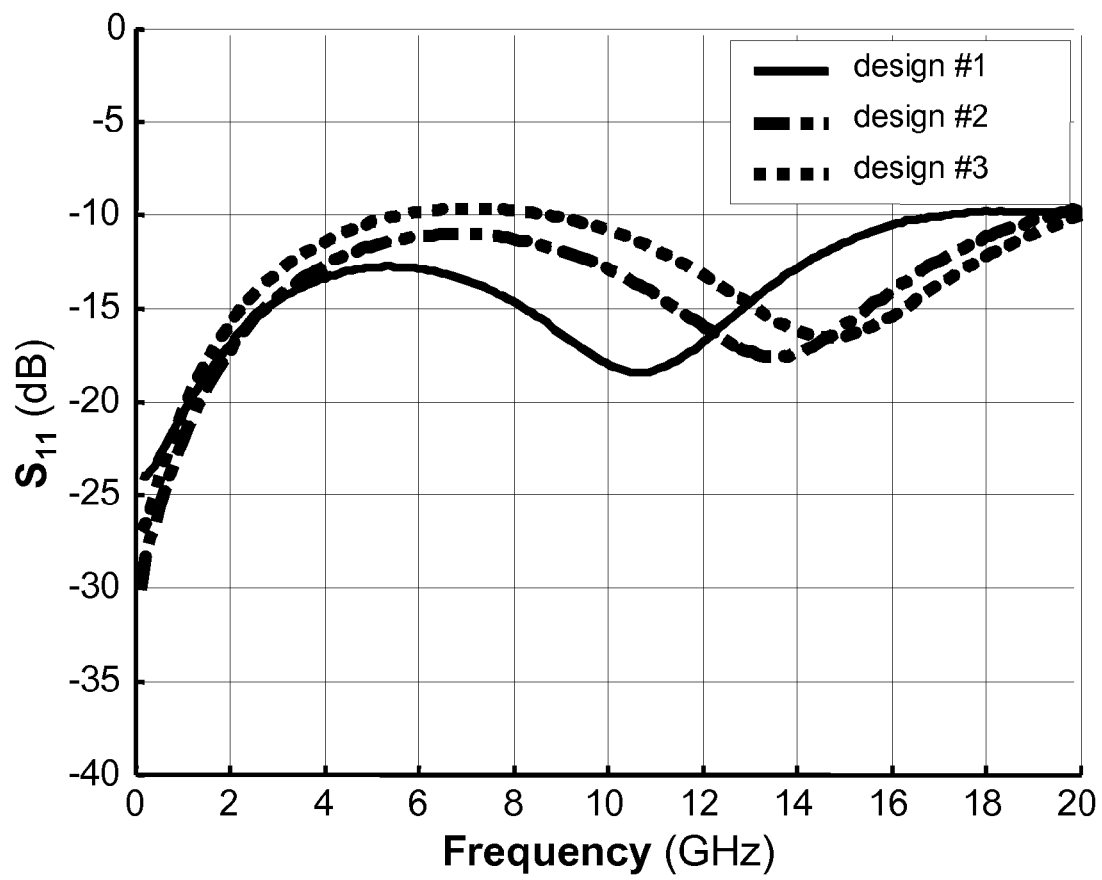
FIG. 5 is a graph of return loss measurements (vertical axis $s_{11}$ [dB], horizontal axis frequency [GHz]) of an 800 µm long modulator with three different amounts of on-chip inductance added.

FIG. 5 shows a graph of the return loss measurements ($s_{11}$ [dB], vertical axis versus frequency [GHz], horizontal axis) of three 800 μm long modulators with different amounts of on-chip inductance added. The amount of inductance added per 200 μm long section of the modulator increases from design #3 to design #1.

Return loss, $s_{11}$, of these 800 μm long modulators shows considerable improvement over the frequency range 2 GHz to 20 GHz as compared to their 600 μm counterpart in FIG. 4, even though they have a 33% higher junction capacitance.

Figure 6:
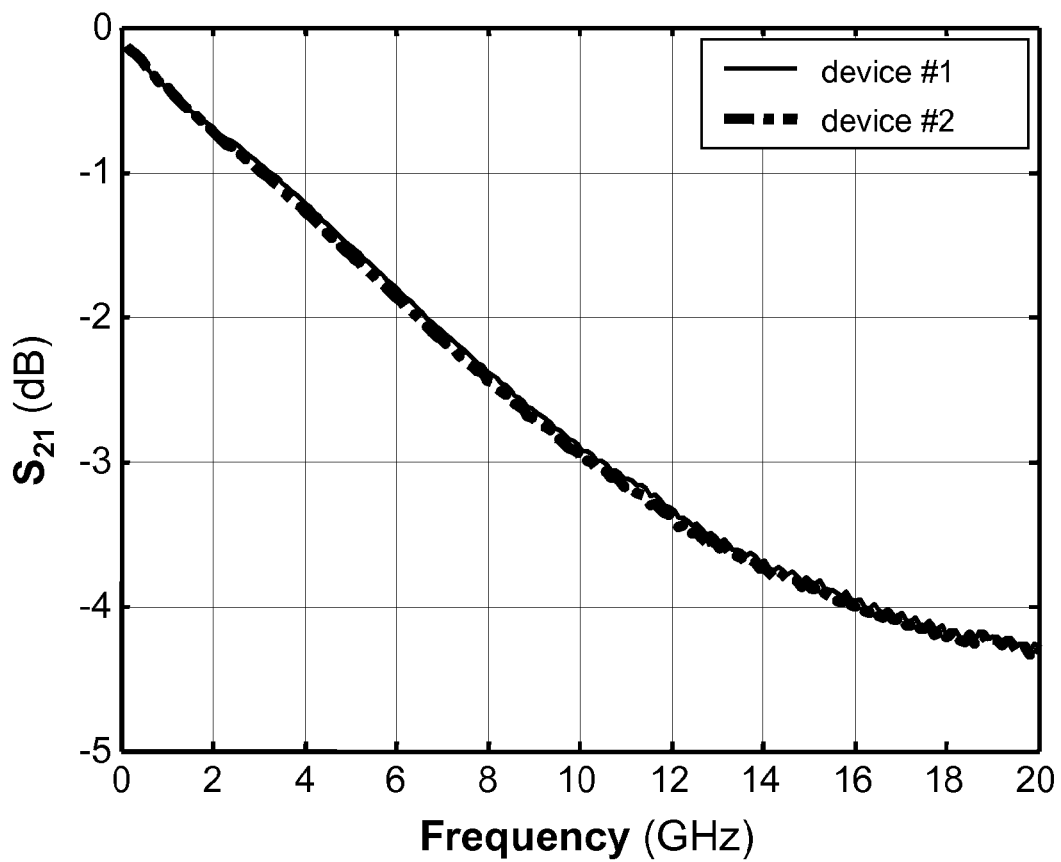
FIG. 6 is a graph of electrical forward loss (vertical axis $s_{21}$ [dB], horizontal axis frequency [GHz]) of 600 µm long modulators with no added on-chip inductance. Measurements are taken with respect to a 50Ω reference impedance. The two traces represent different modulators of identical design.

The measured electrical forward loss of standard 600 μm long modulators without added inductors is plotted in FIG. 6. The electrical forward loss $s_{21}$[dB] on the vertical axis is plotted against frequency [GHz] on the horizontal axis. The electrical −3 dB bandwidth is seen to have a value of ~10 GHz. Measurements were made with respect to a 50Ω reference impedance. Each trace represents a different device of identical design.

Figure 7:
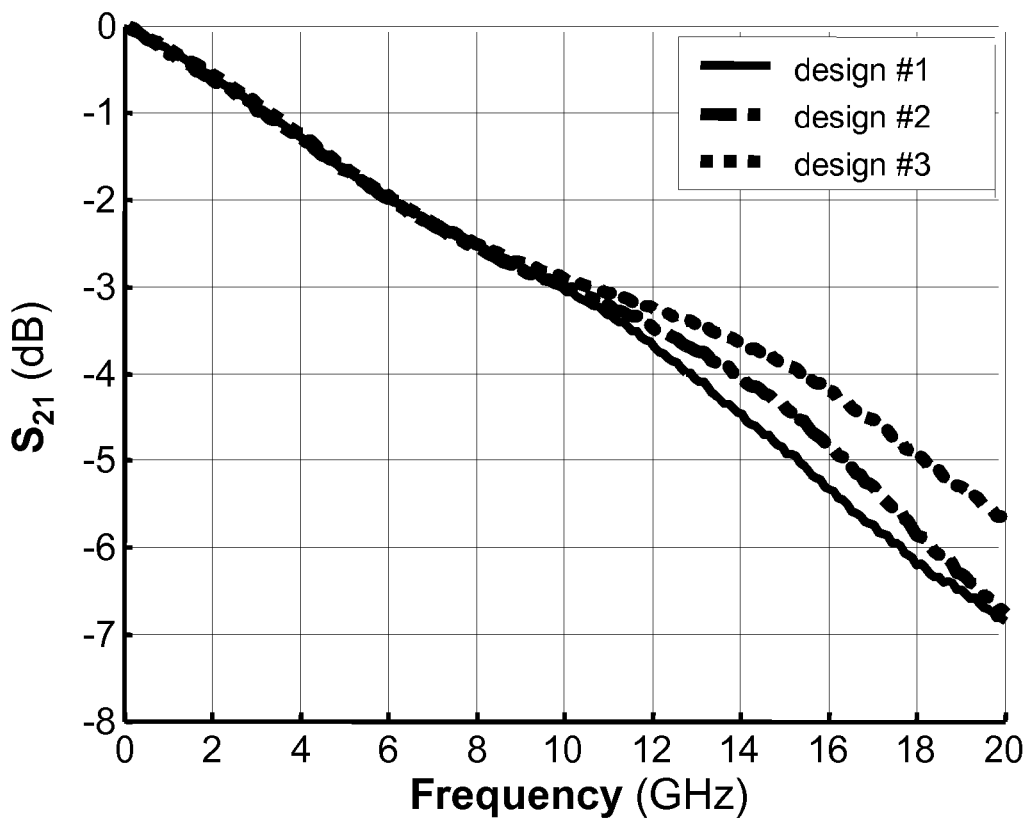
FIG. 7 is a graph of electrical forward loss (vertical axis $s_{21}$ [dB], horizontal axis frequency [GHz]) of 800 µm long modulators with different amount of inductance added. Vertical axis is $S_{21}$ in dB and the horizontal scale is frequency in GHz.

The measured electrical forward loss of 800 μm long modulators with three different amounts of inductance values for the integrated on-chip inductors is plotted in FIG. 7. The electrical forward loss $s_{21}$[dB] on vertical axis is plotted against frequency [GHz] on the horizontal axis. The maximum electrical −3 dB bandwidth is seen to have a value of ~10 GHz, despite the modulators being a 33% longer. The amount of inductance added per 200 μm long section of the modulator increases from design #3 to design #1.

The velocity mismatch achievable with the integrated on-chip reactive components (inductors or capacitors) according to this invention is substantial. A microwave index in the range of 10-13 can be obtained by the addition of on-chip inductors, as obtained by designs #1 to #3 in FIGS. 5 and 7. The optical group index for semiconductors such as InP and InGaAsP typically lies within the range 3.8 to 3.9, not varying significantly as it is largely determined by the optical refractive index of the material used for the waveguide. Thus a velocity mismatch factor of up to approximately 3 to 4 can be achieved in practice.

The effect of velocity mismatch between the electrical and optical signal on the characteristics of a modulator with on-chip inductors or capacitors is explained here. If a mismatch between the velocities of the optical and electrical signals limits the optical bandwidth, $f_0$, of the modulator, the bandwidth due to velocity mismatch can be estimated from Equation 6:

$$f_0 \approx \frac{1.4cL}{\pi |n_0 - n_\mu|} \quad \text{Equation [6]}$$

where c is the velocity of light, $n_o$ and $n_\mu$ are the optical and microwave index respectively.

With the additional on-chip inductors as shown in FIG. 3(b), for instance, the microwave velocity is proportional to the microwave index, $n_\mu$, as calculated from Equation 7:

$$n_\mu \approx c\sqrt{(L_e + L_\mu)(C_j + C_\mu)} \quad \text{Equation [7]}$$

where the $L_e$ is the inductance of the modulator electrode, $L_\mu$ is the on-chip inductance, $C_j$ is the modulator junction capacitance, $C_\mu$ is the parasitic capacitance of the on-chip inductor (if an on-chip capacitor is used, then $C_\mu$ will be the capacitance and $L_\mu$ will be the parasitic inductance) and c is the velocity of light.

The use of either an inductor or a capacitor have the same effect, as shown in the equations [6] and [7]. Hence, inductor will be used in this case for simplicity of explanation.

From equation [7], it can be seen that the addition of on-chip inductors increases the microwave index as a result of its inductance and parasitic capacitance. The increased value of the difference term $|n_o - n_\mu|$ results in bandwidth filtering as a result of velocity mismatch of the optical and electrical signals, shown in equation [6].

Figure 8A:
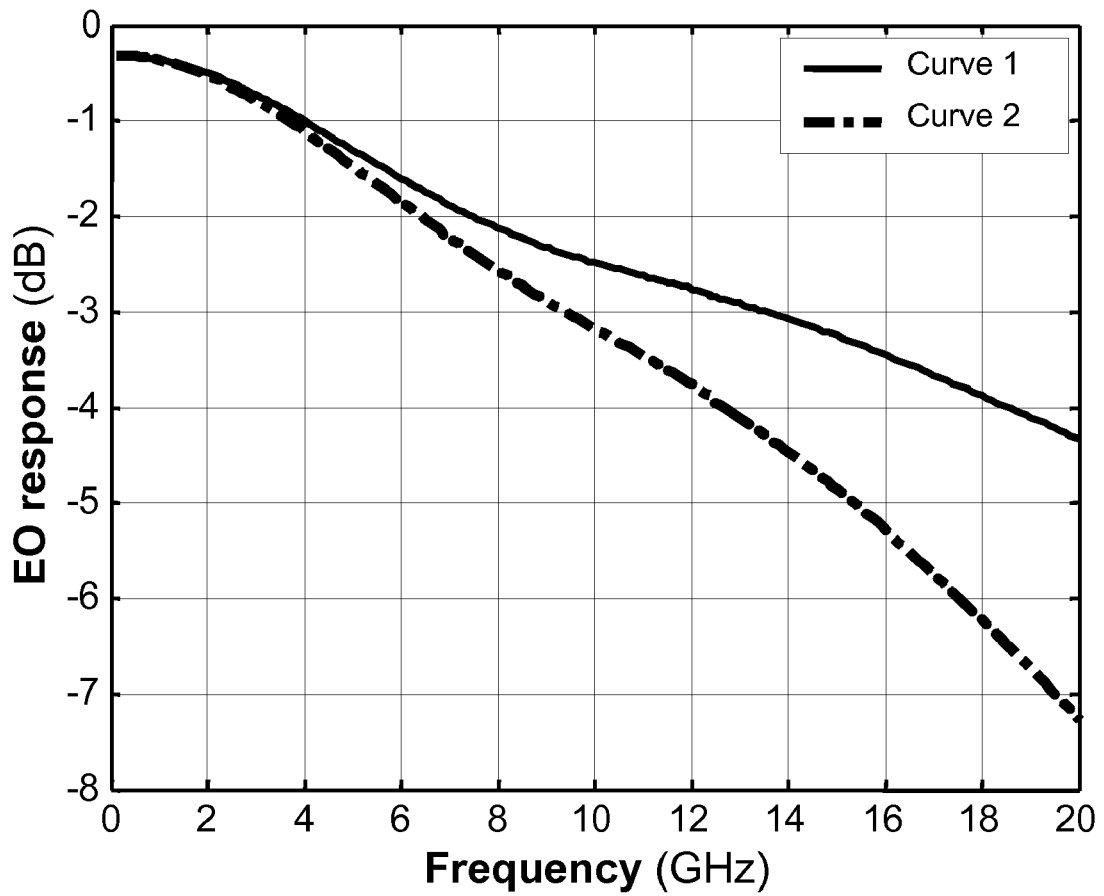
FIGS. 8(a) and 8(b) are graphs of simulated and measured electro-optic responses (vertical axis $s_{21}$ [dB], horizontal axis frequency [GHz]), respectively, of an 800 µm long modulator, illustrating the use of on-chip inductors to introduce velocity mismatch between the traveling electrical and optical signals to produce a sharper roll-off filter.

Simulation results of the device shown in FIG. 3(b) are graphed in FIG. 8(a), where electro-optic (EO) response [dB] is plotted on the vertical axis against frequency [GHz] on the horizontal axis. They illustrate the difference in roll-off filter characteristics achievable through the use of on-chip inductors to introduce velocity mismatch between the traveling electrical and optical signal. Curve 1 describes the EO response of a conventional modulator, while Curve 2 is the response corresponding to the modulator design with velocity mismatch. The frequency roll-off can be estimated from the slope of the curves between 15 GHz and 20 GHz. The conventional modulator (Curve 1) exhibits a 20 dB/decade roll-off, as expected for a typical RC dominated circuit. By incorporating a designed velocity mismatch (Curve 2) a roll-off of 50 dB/decade is obtained, which is significantly higher, corresponding to a $5^{th}$ order filter function.

The velocity mismatch modulator with the steeper EO roll-off has application in spectral filtering for 40 Gbits/s systems. In Optical Duo-Binary modulation format at 40 Gbits/s, the Non-Return to Zero signal is low-pass filtered at 0.25*40 Gbits/s and experimental results show that a sharp roll-off of the order 40 dB/decade is usually required.

Figure 8B:
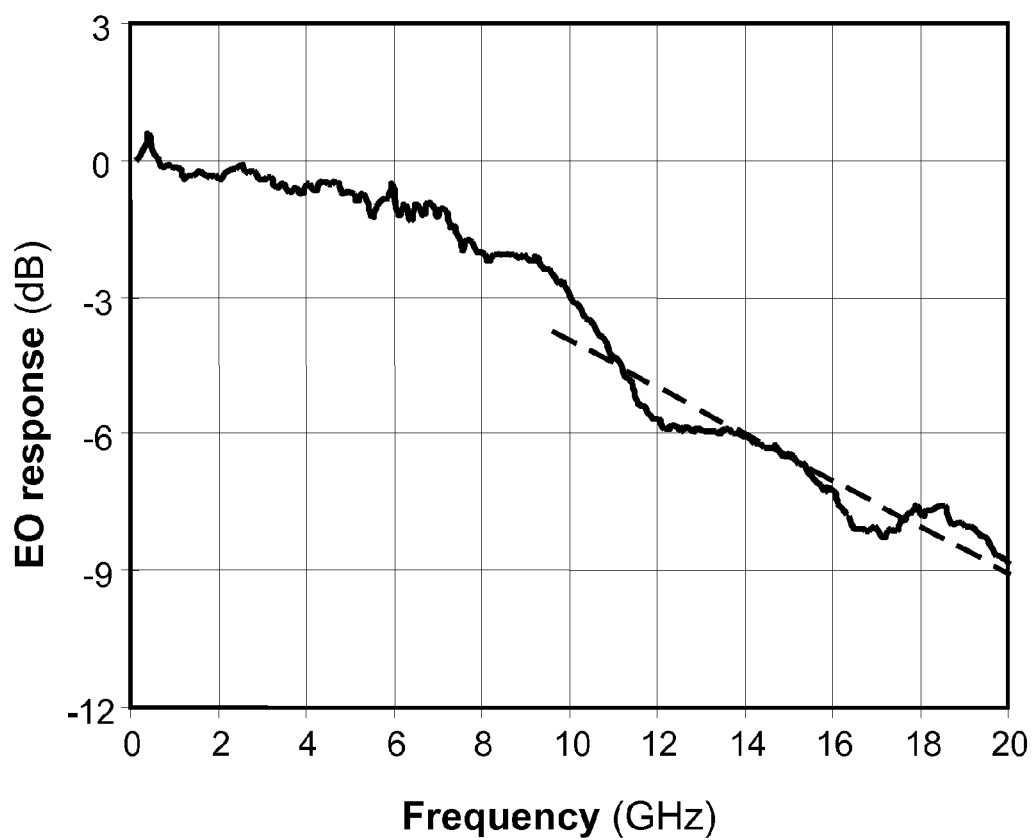

The electro-optic response of an 800 μm long modulator graphed in FIG. 8(b), measured with a network analyzer, indicates a bandwidth of 10 GHz. A linear fit to the measured response after the −3 dB point corresponds to a filter roll-off of 50 dB/decade.

Figure 9:
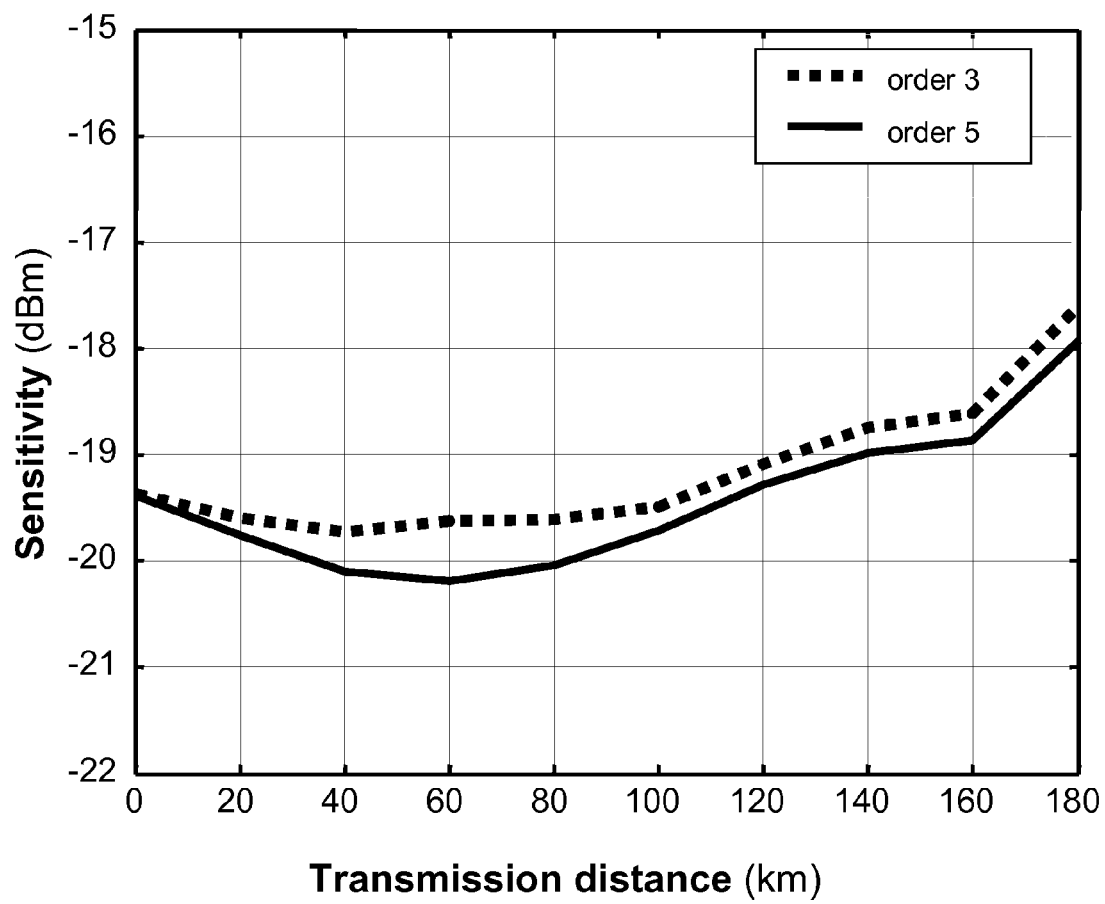
FIG. 9 is a graph showing the simulated sensitivity [dB] on the vertical scale as a function of transmission distance [km] on the horizontal scale.

In FIG. 9, receiver sensitivity [dB] is plotted on the vertical axis against transmission distance [km] on the horizontal axis for a signal modulated at 10 Gbits/s employing an optical duo-binary modulation scheme. The receiver sensitivity for two different electrical filters was simulated, each with a 3 dB bandwidth of 0.25*10 GHz, but with filter roll-offs of $3^{rd}$ and $5^{th}$ orders respectively. The simulations show that a transmitter with $5^{th}$ order filter provides better receiver sensitivity versus transmission distance performance compared to a transmitter with a $3^{rd}$ order filter.

Figure 10:
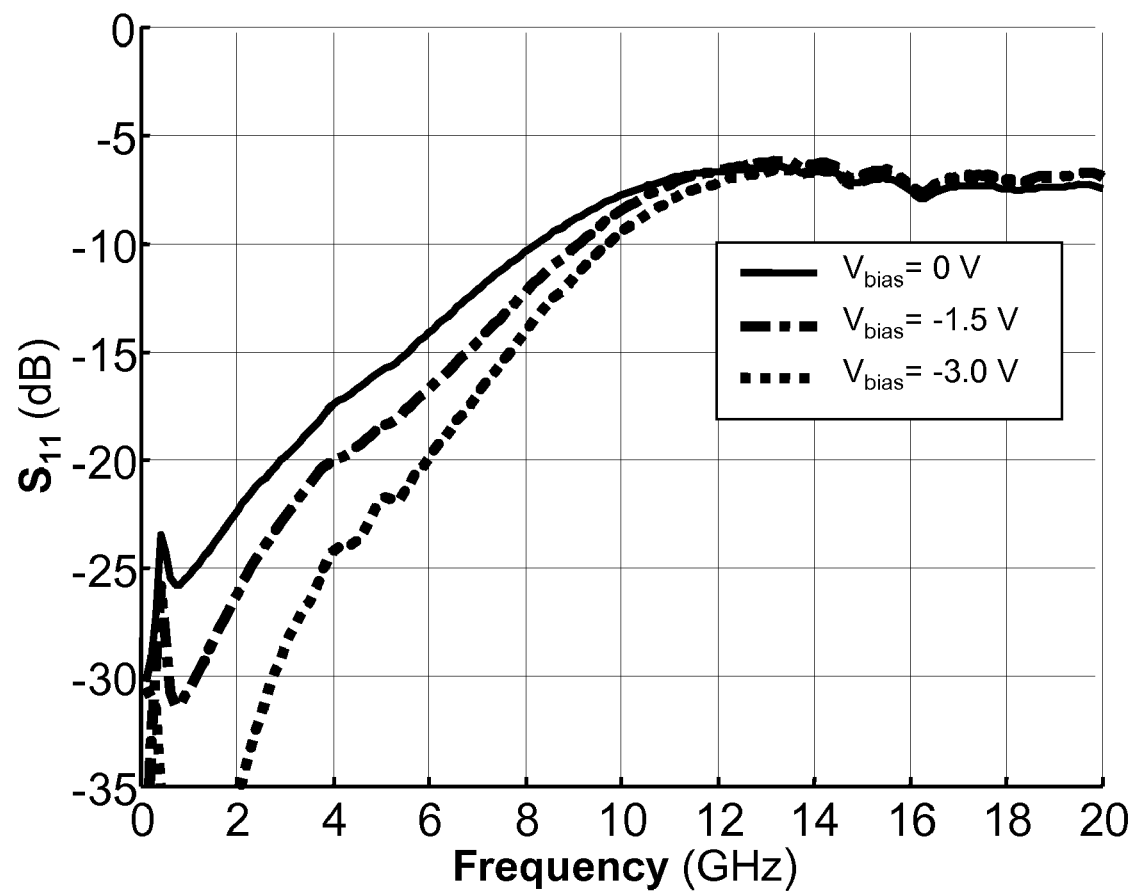
FIG. 10 is a graph showing return loss measurements (vertical axis $s_{11}$ [dB], horizontal axis frequency [GHz]) for a 700 µm long modulator taken at three different bias voltages.

FIG. 10 shows return loss $s_{11}$ [dB] for a 700 μm long modulator without any on-chip inductor plotted on the vertical axis against frequency [GHz] on the horizontal axis with modulator bias voltages of 0, −1.5 and −3.0 volt. The modulator is attached onto a 4 mm×6 mm ceramic carrier that has impedance controlled transmission lines and thin-film matching resistors. The modulator is attached to the transmission lines and termination resistors with wirebonds.

Figure 11:
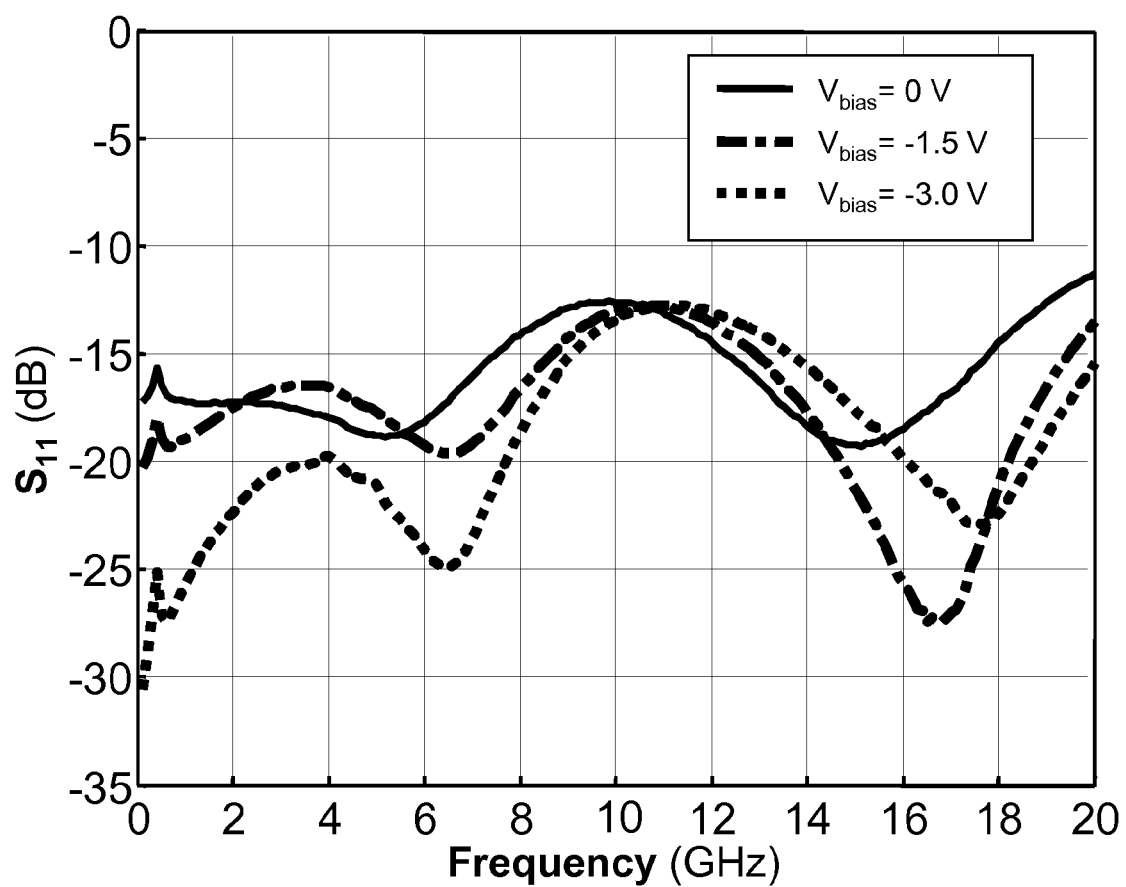
FIG. 11 is a graph of the measured return loss (vertical axis $s_{11}$ [dB], horizontal axis frequency [GHz]) of an integrated laser-Mach Zehnder (ILMZ) 750 µm long device attached on identical chip-on-carrier for three different voltages.

The frequency characteristic of return loss for a 750 μm long modulator with on-chip inductors is shown in FIG. 11. Return loss $s_{11}$ [dB] is plotted on the vertical axis against modulating frequency [GHz] on the horizontal axis with modulator bias voltages of 0, −1.5 and −3.0 volt. The design #1 modulator having the structure shown in FIG. 3(b) is attached onto a 4 mm×6 mm ceramic carrier that has impedance controlled transmission lines and thin-film termination resistors. The modulator is attached to the transmission lines and termination resistors with wirebonds. The improvement of the return loss compared to the typical lumped element design in FIG. 10 is clearly evident.

Whereas $s_{11}$ for the typical lumped element design increases above about −12 dB for frequencies above 9 GHz, for the modulator with on-chip inductors $s_{11}$ remains below −12 dB for practically the whole frequency range of 0-20 GHz.

I claim:

1. An optical modulator, comprising:
a substrate for supporting electrical components;
a conducting layer on a first region of the substrate for providing an electrical ground plane;
an insulating layer on a second region of the substrate for accommodating an electrical circuit;
an electro-optic optical waveguide disposed on the conducting layer for receiving an input optical signal and transmitting an output optical signal;
a traveling wave microstrip electrode having a plurality of contact segments on an upper portion of the optical waveguide for modulating the input optical signal in response to an input modulating signal applied to the microstrip electrode;

a source bond pad disposed on the insulating layer for receiving the input modulating signal from a signal source;

a termination bond pad disposed on the insulating layer for transmitting a residual modulating signal to a termination circuit; and a network of reactive electrical components disposed on the insulating layer, electrically interconnected with the source bond pad, with the termination bond pad and with the plurality of contact segments for modifying a microwave signal velocity in the microstrip electrode.

2. The optical modulator in claim 1, wherein the plurality of contact segments comprises between 2 and 6 contact segments.

3. The optical modulator in claim 1, wherein a total length of the microstrip electrode is between 700 μm and 900 μm.

4. The optical modulator in claim 1, wherein the network of reactive electrical components comprises:

a first inductor connected from the source bond pad to a first tap on a first contact segment of the plurality of contact segments;

a last inductor connected from the termination bond pad to a last tap on a last contact segment of the plurality of contact segments; and an inter-segment inductor connected between taps on each two consecutive contact segments of the plurality of contact segments.

5. The optical modulator in claim 4, wherein the inter-segment inductor has an inductance between about 0.15 nH and 0.4 nH.

6. The optical modulator in claim 4, wherein each inter-segment inductor has an inductance between about 0.22 nH and 0.34 nH.

7. The optical modulator in claim 1, wherein the network of reactive electrical components comprises an inductor in series connection between proximate ends of two consecutive contact segments.

8. The optical modulator in claim 1, wherein a segment length of the plurality of contact segments is between 200 μm and 300 μm.

9. The optical modulator in claim 1, wherein the electro-optic optical waveguide comprises a semiconductor material selected from the group consisting of indium phosphide, gallium arsenide, and indium gallium arsenide phosphide.

10. The optical modulator in claim 1, wherein the network of reactive electrical components is dimensioned to create a predefined velocity mismatch factor between an optical signal velocity in the optical waveguide and the microwave signal velocity in the microstrip electrode for modifying a modulator filter characteristic.

11. The optical modulator in claim 10, wherein the velocity mismatch factor is between 2 and 4.

12. A method for limiting a spectral bandwidth of an optical signal with an optical modulator chip comprising a segmented microstrip electrode, an optical waveguide, and an electrical network of reactive components interconnecting electrode segments of the segmented microstrip electrode, the method comprising providing an optical input from a lightsource;

applying a microwave signal having a microwave signal velocity to the segmented microstrip electrode;

modulating the optical input with the segmented microstrip electrode to generate an optical signal having an optical signal velocity in the optical waveguide; and modifying the microwave signal velocity in the segmented microstrip electrode with the network of reactive components to produce a predefined velocity mismatch factor with the optical signal velocity for modifying a modulator filter characteristic.

13. The method in claim 12, wherein the velocity mismatch factor is between 2 and 4.

* * * * *